United States Patent [19]

Ramspacher et al.

[11] Patent Number: 4,662,531

[45] Date of Patent: May 5, 1987

[54] SNAP-TOGETHER LATCH FOR TELEVISION CABINET

[75] Inventors: Robert J. Ramspacher, Indianapolis, Ind.; William J. Bachman, Mt. Laurel; Franklin R. DiMeo, Woodbury, both of N.J.

[73] Assignee: RCA Corporation, Princeton, N.J.

[21] Appl. No.: 840,221

[22] Filed: Mar. 17, 1986

[51] Int. Cl.[4] .................. A47B 81/06; B65D 6/24; B65D 41/16; H01R 13/44
[52] U.S. Cl. .................... 220/4 B; 320/307; 320/306; 312/7.1; 312/7.2
[58] Field of Search ............... 220/4 B, 4 E, 306, 307; 312/7.1, 7.2

[56] References Cited

U.S. PATENT DOCUMENTS

| 618,895 | 2/1899 | Munday . | |
|---|---|---|---|
| 2,259,382 | 10/1941 | Ingels . | |
| 2,695,723 | 11/1954 | Waferman | 220/4 E |
| 2,817,132 | 12/1957 | Petri . | |
| 3,359,374 | 12/1967 | Joseph | 312/7.2 |
| 3,637,246 | 1/1972 | Leiter . | |
| 3,672,530 | 6/1972 | Bridenstino | 220/307 |
| 3,752,553 | 8/1973 | Bildahl et al. . | |
| 4,004,734 | 1/1977 | Hadtke | 220/30 |
| 4,005,367 | 1/1977 | Dano | 312/7.1 |
| 4,034,888 | 7/1977 | Strauss | 220/307 |
| 4,256,235 | 3/1981 | Klamandt | 220/306 |
| 4,411,480 | 10/1983 | Gibson . | |
| 4,416,038 | 11/1983 | Morrone, III . | |
| 4,471,980 | 9/1984 | Hickman . | |
| 4,635,809 | 1/1987 | Bachman et al. | 220/4 B |

*Primary Examiner*—George E. Lowrance
*Attorney, Agent, or Firm*—Paul J. Rasmussen; Eric P. Herrmann; Dilip A. Kulkarni

[57] ABSTRACT

The back cover of a TV cabinet is provided with a J-shaped latch member for releasable reception in a slot disposed in the cabinet front during cabinet assembly. The back cover is equipped with a window for providing access to the latch member, so that a tool can be inserted into the cabinet enclosure through the slot to release the latch member. The cabinet front is provided with a partition surrounding the latch member to prevent inadvertent insertion of a tool into the cabinet enclosure beyond the partition.

13 Claims, 11 Drawing Figures

4,662,531

SNAP-TOGETHER LATCH FOR TELEVISION CABINET

This invention relates to a snap-type latch for releasably securing the two halves of a television cabinet.

BACKGROUND

Typically, the cabinet of a portable television (TV) receiver is made up of a pair of injection molded halves—the cabinet front and the back cover, which are molded from a suitable thermoplastic material (e.g., polystyrene). The picture tube and the chassis carrying the electronics are mounted to the cabinet front. The back cover is then secured to the front cover to complete the instrument assembly.

The fastening means used for attaching the back cover to the cabinet front must fulfill a number of basic requirements. The fastening means must withstand shock and vibration encountered during handling and shipping. The fastening means must allow quick disengagement of the back cover from the cabinet front to permit servicing of the television instrument, and it must allow subsequent re-assembly of the back cover. Moreover, the fastening means must not permit inadvertent insertion of a tool into the cabinet enclosure to reduce safety hazards.

Traditionally, the TV cabinet halves have been joined together with screw type fasteners, since they meet the above-mentioned basic requirements. However, a disadvantage of the screw type fasteners is that they are not amenable to automatic assembly of the television instrument. The assembly time required to install the screws is relatively large. Furthermore, relatively sophisticated equipment is required for automatically tightening the screws.

SUMMARY OF INVENTION

In accordance with this invention, the cabinet halves of a TV receiver are releasably held together by a snap-type latch mechanism, instead of screws. The subject latch mechanism includes a J-shaped latch member disposed on the back cover and a slot disposed in the cabinet front for releasably securing the latch member when the cabinet halves are assembled to each other. The back cover is further equipped with a window for providing access to the latch member, so that a tool can be inserted therethrough to release the latch. The cabinet is provided with a guard for limiting insertion of a tool into the cabinet enclosure.

IN THE DRAWINGS

Figure 2:
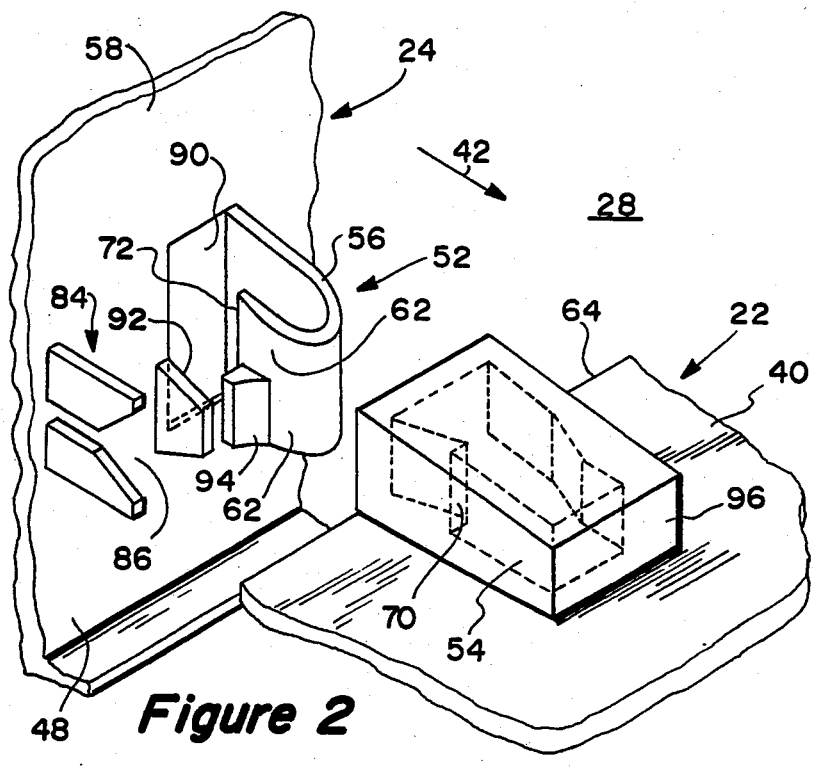
FIGS. 2 and 3 depict perspective views of the subject J-type latch before and after the assembly of the cabinet halves respectively.
Figure 3:
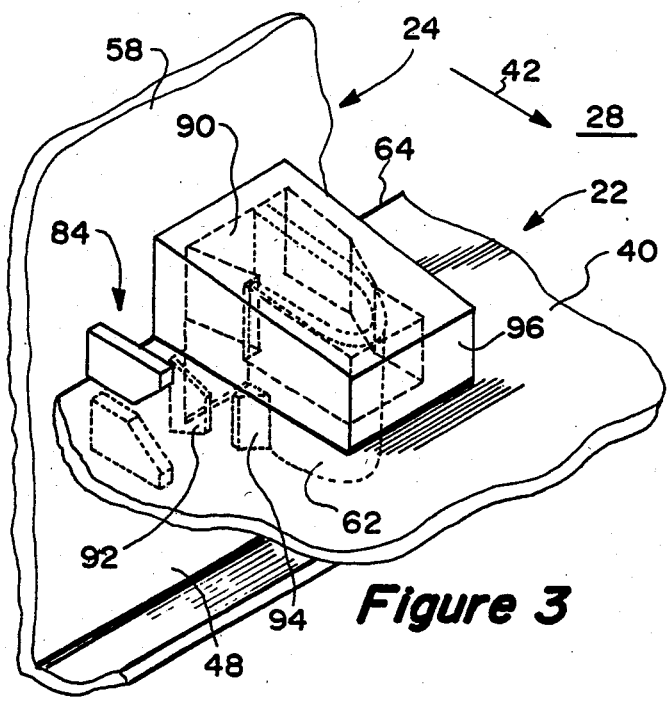
Figure 4A:
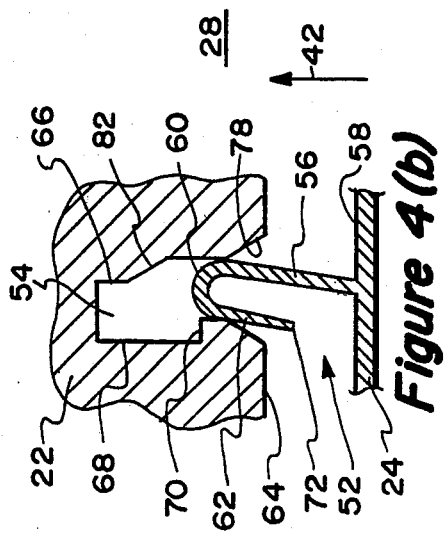
Figure 4B:
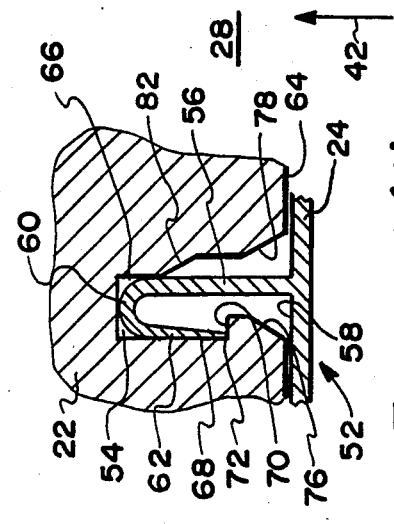
Figure 4C:
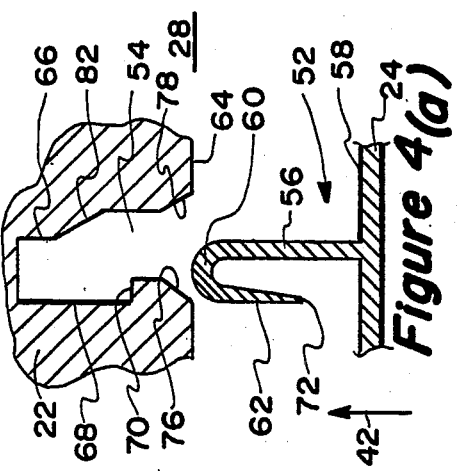
Figure 4D:
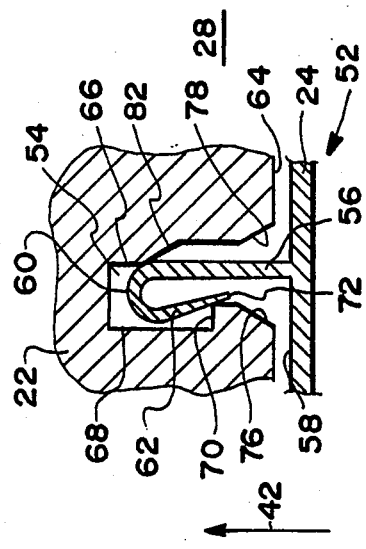
Figure 5:
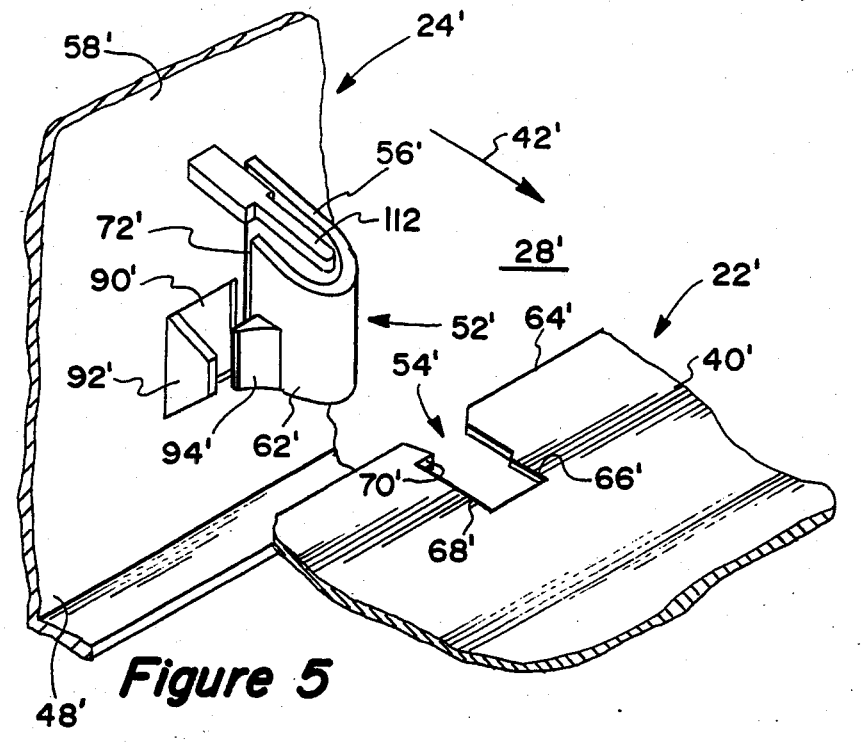
Figure 6:
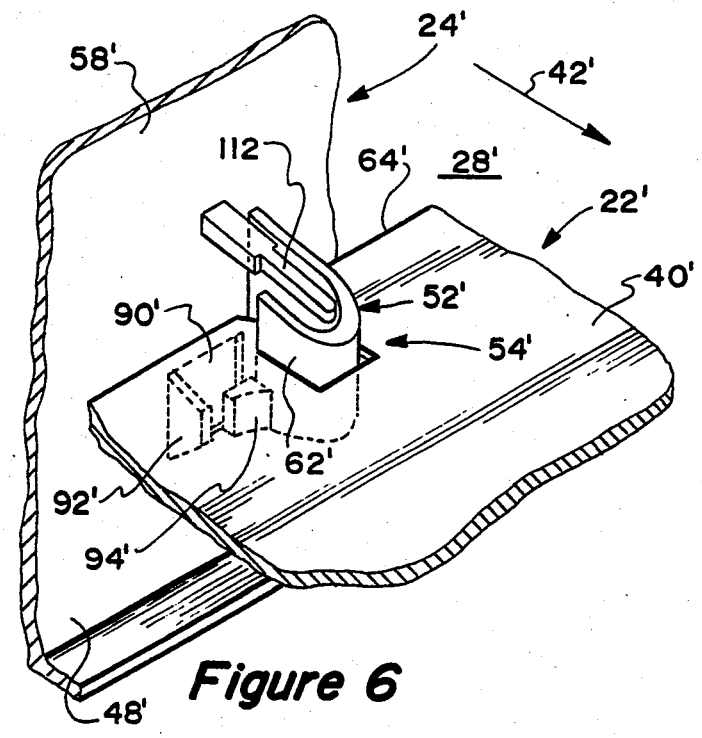
Figure 7:
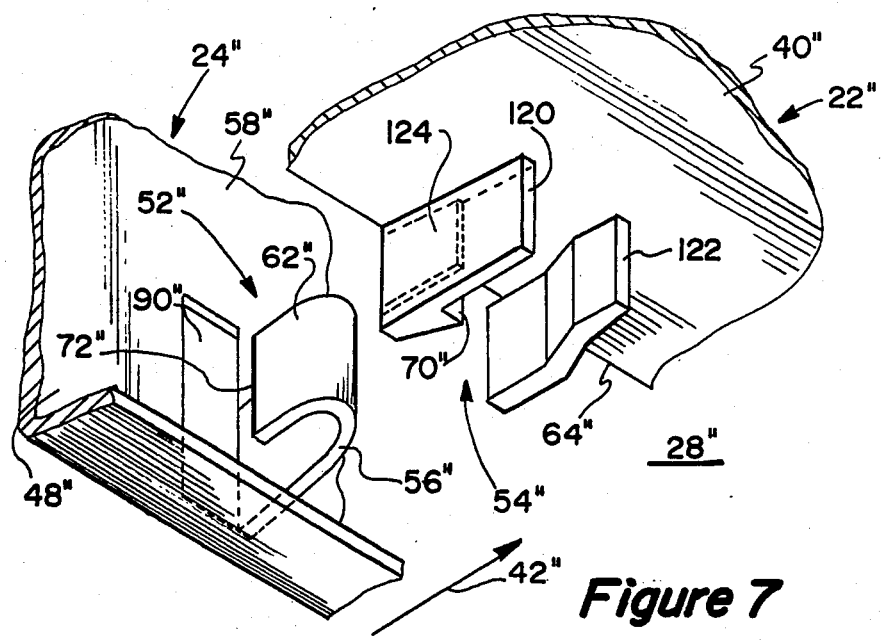
Figure 8:
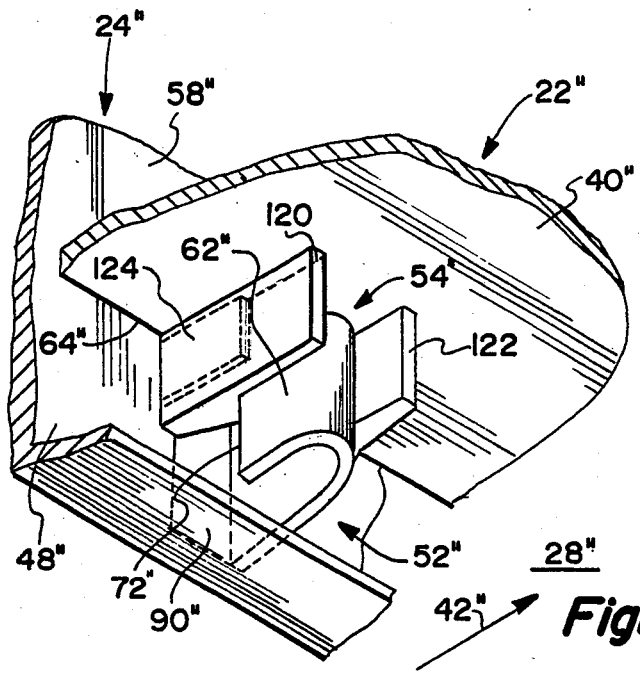

FIGS. 4 (a) through (d) schematically show a sequence of operations for the J-type latch of FIGS. 2 and 3;

FIGS. 5 and 6 illustrate perspective views of a further embodiment of the subject J-type latch before and after the cabinet assembly respectively; and FIGS. 7 and 8 represent still another embodiment of the instant J-type latch.

DETAILED DESCRIPTION

Figure 1:
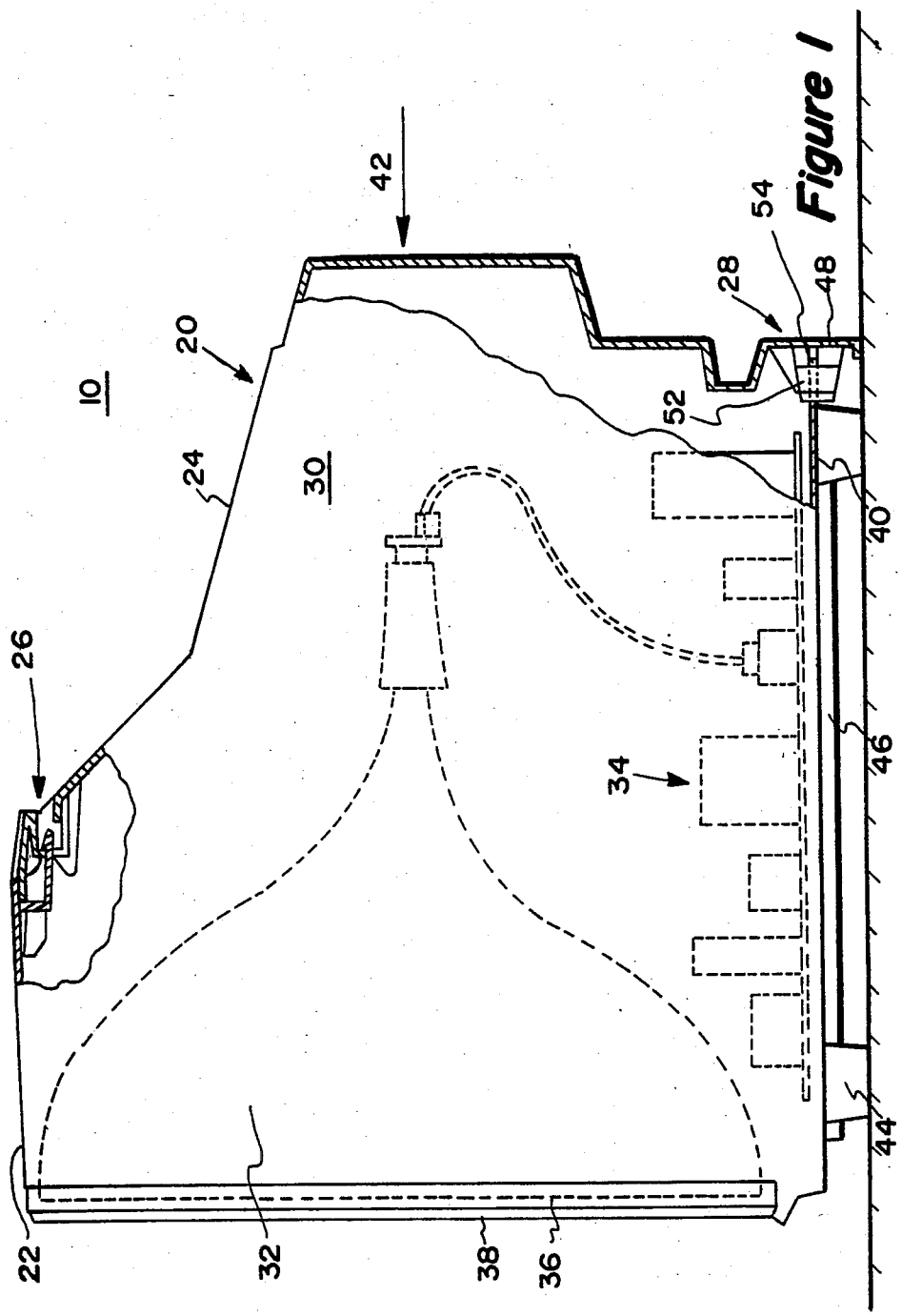
FIG. 1 is a partial cross-sectional view of a TV receiver incorporating a J-type snap-together latch for releasably securing the back cover to the cabinet front in accordance with this invention.

As shown in FIG. 1, a TV receiver 10 includes a cabinet 20, which consists of a pair of cabinet halves—the cabinet front 22 and the back cover 24. The cabinet front 22 and the back cover 24 are both injection molded from a suitable thermoplastic material (e.g., polystyrene). The back cover 24 is releasably attached to the cabinet front 22 by means of a pair of snap-together latches 26 on the top side, and another pair of snap-together latches 28 on the bottom side of the cabinet in the manner described hereinbelow.

When the cabinet halves 22 and 24 are assembled to each other, they form an enclosure 30 for housing a picture tube 32 and an electronic chassis 34 of the TV receiver 10. The picture tube 32 is mounted to the cabinet front 22 such that the screen 36 is exposed through an opening 38 in the cabinet front. The chassis 34, on the other hand, is mounted on the bottom shelf 40 of the cabinet front 22. After installation of various components to the cabinet front 22—including the picture tube 32 and the chassis 34, the back cover 24 is pressed into the cabinet front 22 along a forwardly direction 42 defined by the respective guide surfaces thereof to complete the assembly of the TV instrument.

The bottom shelf 40 of the cabinet front 22 is provided on the underside with a pair of leg portions 44 for supporting the TV cabinet 20, and a plurality of reinforcing ribs 46 for rigidifying the cabinet structure. The back cover 24 has an overhanging portion 48 extending along the bottom edge for enclosing the gap between the bottom shelf 40 and the supporting surface (e.g., table top).

The snap-together latches 26 arranged on the top side of the cabinet 20 are of the type disclosed in a copending U.S. patent application, Ser. No. 799,217, assigned to the common assignee. Basically, each of the latches 26 consists of a pair of oppositely-disposed interlocking members mounted side by side on the respective cabinet halves 22 and 24. Reference may be made to the aforesaid copending application for further details of the side-by-side latches.

The cabinet 20 is equipped with, on the bottom side thereof, a pair of snap-together latches 28 pursuant to the present invention. FIGS. 2 and 3 respectively show the latches 28 prior to and subsequent to the cabinet assembly. As can be seen therefrom, each of the latches 28 consists of a J-shaped latch member 52 disposed on the back cover 24, which is releasably received in a slot 54 arranged in the bottom shelf 40 of the cabinet front 22.

FIGS. 4 (a) through (d) diagrammatically depict the steps involved in the reception of the J-shaped latch member 52 in the slot 54. As shown therein, the J-shaped latch member 52 has a root-end portion 56 extending away from the inner surface 58 of the back cover 24, an intermediate portion 60 extending laterally from the root-end portion, and a free-end portion 62 extending toward the inner surface 58.

The slot 54 is disposed in the bottom shelf 40 in communication with a rear edge 64 thereof. The slot 54 has a pair of laterally-spaced, opposed walls 66 and 68 for respectively engaging the root-end and free-end portions 56 and 62 of the latch member 52 upon reception thereof in the slot. The wall 68 of the slot 54 has an inwardly-turned edge—forming a ledge 70 for capturing a terminal surface 72 of the latch member 52 as shown in FIG. 4 (d), thereby preventing extraction of the latch member 52 from the slot 54.

The intermediate portion 60 of the latch member 52 has an outer surface that converges in the forwardly direction 42. As the latch member 52 is fully inserted into the slot 54, the converging outer surface of the intermediate portion 60 is lodged between the oppositely-disposed walls 66 and 68 of the slot to prevent lateral movement of the latch member relative to the slot. This, in turn, precludes accidental opening of the cabinet 20 during handling and shipping.

The slot 54 is additionally provided with, near the open end thereof, a pair of opposed walls 76 and 78, which diverge toward the rear edge 64 of the bottom shelf. The diverging walls 76 and 78 guide entry of the latch member 52 into the slot 54 in the manner illustrated in FIGS. 4 (a) and (b).

As the latch member 52 is driven into the slot 54, the tapering wall 76 of the slot engages the intermediate portion 60 of the latch member and deflects it toward the root-end portion 56 in the manner shown in FIG. 4 (b). During further advancement of the latch member 52, the intermediate portion 60 engages a slanted wall 82 of the slot 54 to bend the latch member back toward its original position. As the latch member 52 is fully engaged, both the root-end and free-end portions 56 and 62 return to their normal unstressed positions and the terminal surface 72 of the free-end portion 60 is seated firmly against the ledge 70 of the slot 54 in the manner shown in FIG. 4 (d).

The assembled latch is substantially unstressed, as depicted in FIG. 4 (d), to prevent it from developing a permanent set.

Disposed on the interior surface 58 of the back cover 24 are a plurality of guide members 84, as shown in FIGS. 2 and 3. The guide members 84 form slots 86 for capturing the rear edge 64 of the bottom shelf 40. The guide members 84 assure vertical registration between the cabinet halves 22 and 24, and also limit vertical forces on the latches 26 and 28. The cabinet halves 22 and 24 are further provided with additional guide surfaces (not shown) to assure lateral registration. The engagement of the rear edge 64 of the cabinet front 22 with the inner surface of the back cover 24 determines front-to-back registration of the cabinet halves.

The back cover 24 is equipped with a window 90 for providing access to the free-end portion 62 after the cabinet assembly. An implement (e.g., screw driver) can be inserted through the window 90 to dislodge the terminal surface 72 of the latch member 52 from the ledge 70 of the slot 54 to allow quick disassembly of the cabinet halves 22 and 24.

To facilitate disengagement of the latch member 52, the back cover 24 is provided with a tab 92 adjacent to a tooth 94 disposed on the free-end portion 62. A flat-headed screw driver may be inserted between the tab 92 and the tooth 94, and twisted to release the latch member 52.

Alternatively, a screw driver may be inserted to engage the outer surface of the free-end portion 62 and pivoted against an adjacent edge of the window 90 (with the window edge as a fulcrum) to free the latch member 52.

A canopy 96 is integrally molded on the top or chassis side of the bottom shelf 40, such that it limits inadvertent insertion of a tool into the cabinet enclosure 30 to reduce the possibility of shock hazard or damage.

FIGS. 5, 6 and 7, 8 illustrate further embodiments of the present invention. In the drawings, like parts are designated by the same numerals—except that the numerals in FIGS. 5, 6 and 7, 8 are respectively provided with one and two primes.

In the embodiment of FIGS. 5 and 6, the access window 90' in the back cover 24 does not extend above the bottom shelf 40' of the cabinet front 22. To further reduce the possibility of inadvertent insertion of a tool into the cabinet enclosure 30, the back cover 24 has integrally molded thereon a bar 112 above the latch member 52 as depicted in FIGS. 5 and 6.

To release the latch 28' in the embodiment of FIGS. 6 and 7, a tool is inserted through the window 90' disposed below the bottom shelf 40' to free the terminal surface 72' of the latch member 52'.

In the embodiment of FIGS. 7 and 8, the bottom shelf 40'' is provided with, on the underside thereof, a pair of laterally-spaced walls 120 and 122. The laterally-spaced walls 120 and 122 define a slot 54'' for receiving the latch member 52''. The overhanging portion 48'' of the back cover 24'' is equipped with a window 90'' for providing access to the latch member 52''.

The inner surface of the wall 120 is provided with a recess 124, so that a tool can be inserted into the recess between the free-end portion 62'' and the wall 120 to dislodge the terminal surface 72'' of the latch member 52'' from the ledge 70'' of the slot 54'' to free the back cover 24''.

Typically, the front cabinet 22 and back cover 24 are injection molded from a suitable plastic material—e.g., polystyrene. Various parts of the latch 28—such as J-shaped latch member 52, slot 54, access window 90, canopy 96, etc.—can be integrally molded with the respective cabinet halves with minimal additional cost.

An advantage of the subject latch 28, pursuant to this invention, is that lateral forces acting on the latch do not cause disengagement thereof, because relative displacement between the latch member 52 and the slot 54 is inhibited in the lateral direction. An additional advantage of the subject latch 28 is that forces tending to withdraw the latch member 52 from the slot 54 serve to further increase the engagement of the latch.

Furthermore, as previously indicated, the vertical and lateral forces acting on the cabinet halves 22 and 24 are taken up by respective guide surfaces (e.g., 84), and are not directly transferred to the latch members 52. As a result, only axial forces are transmitted to the latch members 52. This is more desirable in terms of latch strength requirements. The subject latch allows quick disengagement of the back cover from the cabinet front. Furthermore, it permits subsequent reassembly of the cabinet halves. It precludes inadvertent insertion of a tool into the cabinet enclosure. Additionally, the subject latch is amenable to automation. The back cover is assembled simply by inserting it into the cabinet front along the guideways.

What is claimed is:

1. A cabinet for electronic components comprising:
   a pair of cabinet halves defining an enclosure for housing said electronic components as one of said cabinet halves is mated with the other of said cabinet halves;
   a J-shaped latch member disposed on said one cabinet half; said latch member including a root-end portion connected to and extending away from the inner surface of said one cabinet half, and a laterally-spaced, free-end portion extending toward said inner surface from the non-supported end of said root-end portion; said free end portion having a terminal surface disposed toward said inner surface;

a slot disposed in said other cabinet half in communication with a rear surface thereof for releasably receiving said latch member during mating of said one cabinet half with said other cabinet half; said slot having first and second laterally-spaced walls respectively engaging said root-end and free-end portions of said latch member so as to inhibit lateral movement of said latch member relative to said slot upon reception of said latch member in said slot; said second wall of said slot in engagement with said free-end portion being provided with a ledge portion for capturing said terminal surface of said free-end portion to prevent withdrawal of said latch member from said slot subsequent to said reception;

said cabinet having a window for providing access to said free-end portion of said latch member after assembly of said cabinet halves; said window permitting insertion of a tool to disengage said terminal surface of said latch member from said ledge portion of said slot to allow disassembly of said cabinet halves; and means for limiting penetration of said tool into said enclosure through said window.

2. The cabinet defined in claim 1 further including a fixedly-disposed wall having a surface juxtaposed with said free-end portion and disposed opposite from said root-end portion, so that a tool can be inserted through said window and wedged between said juxtaposed wall and said free-end portion to release said latch member from said slot.

3. The cabinet defined in claim 2 wherein said fixedly-disposed wall comprises an edge of said window disposed near said free-end portion.

4. The cabinet defined in claim 1 wherein said latch member additionally includes a laterally-disposed intermediate portion interconnecting said root-end portion and said free-end portion; said laterally-disposed intermediate portion being dimensioned and configured such that it is lodged between said laterally-spaced walls of said slot to block lateral movement of said latch member with respect to said slot upon said reception of said latch member in said slot.

5. The cabinet defined in claim 1 wherein said slot in said other cabinet half is further provided with a pair of opposed walls which diverge from said laterally-spaced walls toward said rear surface of said other cabinet half to facilitate entry of said latch member into said slot.

6. The cabinet defined in claim 1 wherein said limiting means comprises a partition disposed inside said cabinet to form a compartment around said latch member in order to block insertion of a tool into said cabinet beyond said partition.

7. The cabinet defined in claim 6 wherein said cabinet halves are injection molded from a suitable plastic material; wherein said latch member is integrally molded with said one cabinet half; wherein said partition defining said compartment is integrally molded with said other cabinet half along with said slot.

8. The cabinet defined in claim 1 wherein said other cabinet half is provided with a substantially planar bottom shelf having said slot therein; wherein said one cabinet half is equipped with guide means for receiving the rear edge of said bottom shelf, thereby facilitating said insertion of said one cabinet half into said other cabinet half.

9. The cabinet defined in claim 1 wherein the lateral location of said latch member with respect to said slot is such that said root-end portion of said latch member is in a substantially unstressed condition upon said assembly.

10. A cabinet for electronic components comprising:
a pair of cabinet halves defining an enclosure for housing said electronic components when one of said cabinet halves is mated with the other of said cabinet halves;

a J-shaped latch member disposed on said one cabinet half; said latch member including a root-end portion connected to and extending away from the inner surface of said one cabinet half, and a laterally-spaced, free-end portion extending toward said inner surface from the non-supported end of said root-end portion; said free-end portion having a terminal surface disposed toward said inner surface;

a slot disposed in said other cabinet half in communication with a rear surface thereof for releasably receiving said latch member during mating of said one cabinet half with said other cabinet half; said slot having first and second oppositely-disposed walls respectively engaging said root-end and free-end portions of said latch member, thereby inhibiting lateral movement of said latch member relative to said slot upon reception of said latch member in said slot; said second wall of said slot in engagement with said free end portion being provided with a ledge portion for engaging said terminal surface of said free-end portion to prevent withdrawal of said latch member from said slot subsequent to said reception;

wherein said terminal surface is dimensioned such that a portion thereof extends outside the confines of said enclosure through said slot upon assembly of said cabinet halves; and a window disposed in said one cabinet half for providing access to said portion of said terminal surface extending outside said enclosure; said window permitting insertion of a tool therethrough to disengage said terminal surface of said latch member from said ledge portion of said slot to allow disassembly of said cabinet halves.

11. The cabinet defined in claim 10 further including a bar disposed inside said cabinet enclosure to block penetration of a tool into said cabinet enclosure through said slot beyond said bar.

12. A cabinet for electronic components comprising:
a pair of cabinet halves—a cabinet front and a back cover; said cabinet front having a bottom shelf; said cabinet front and back cover defining an enclosure above said bottom shelf for housing said electronic components when said back cover is mated with said cabinet front; said back cover having an overhanging portion extending below said bottom shelf of said cabinet front upon assembly of said cabinet halves;

a J-shaped latch member having a root-end portion connected to and extending away from the inner surface of said overhanging portion of said back cover, and a laterally-spaced, free-end portion extending toward said inner surface from the non-supported end of said root-end portion; said free-end portion having a terminal surface disposed toward said inner surface; the location of said latch member being such that it is disposed underneath said bottom shelf upon said cabinet assembly;

said cabinet front being provided with first and second laterally-spaced walls disposed on the underside of said bottom shelf; said laterally-spaced walls forming a slot for releasably receiving said latch member as said back cover is mated with said cabinet front; said first and second walls respectively engaging said root-end and free-end portions of said latch member to inhibit lateral movement of said latch member relative to said slot upon reception of said latch member therein; said second wall in engagement with said free-end portion being provided with a ledge portion for capturing said terminal surface of said free-end portion to prevent extraction of said latch member from said slot upon said reception; and a window disposed in said overhanging portion of said back cover for providing access to said free-end portion of said latch member after said cabinet assembly; said window permitting insertion of a tool to disengage said terminal surface of said latch member from said ledge portion of said slot to allow disassembly of said cabinet halves.

13. The cabinet defined in claim 12 wherein the inner surface of said second wall in engagement with said free-end portion is provided with a recess so that a tool can be inserted into said recess between said free-end portion and said second wall to dislodge said terminal surface from said ledge portion of said slot.

* * * * *